Dec. 27, 1949  B. SMITH ET AL  2,492,715
THROTTLE LEVER

Filed March 2, 1945  2 Sheets-Sheet 1

INVENTORS
BERT SMITH
CHARLES RINGEL
BY James J. Whalen

Dec. 27, 1949  B. SMITH ET AL  2,492,715
THROTTLE LEVER

Filed March 2, 1945  2 Sheets-Sheet 2

INVENTORS
BERT SMITH
CHARLES RINGEL

BY James J. Whalen

Patented Dec. 27, 1949

2,492,715

UNITED STATES PATENT OFFICE 2,492,715

THROTTLE LEVER

Bert Smith, Teaneck, and Charles Ringel, Hawthorne, N. J., assignors to American Throttle Company, Inc., New York, N. Y.

Application March 2, 1945, Serial No. 580,568

2 Claims. (Cl. 74—471)

1

The present invention relates to mechanism for operating locomotive throttles particularly adapted for use with locomotives wherein more than one throttle is utilized as for example where separate forward and reverse throttles are employed.

In carrying out the invention the locomotive is provided with independent throttles for forward and reverse motions while only a single throttle actuating lever is provided in the locomotive cab. The usual throttle rods and linkages are provided for each of the throttles and arranged to be coupled selectively to the throttle operating lever in the cab. The invention will be best understood upon reference to the accompanying detailed description of an illustrative embodiment thereof when read in conjunction with the accompanying drawings in which.

Figure 1:
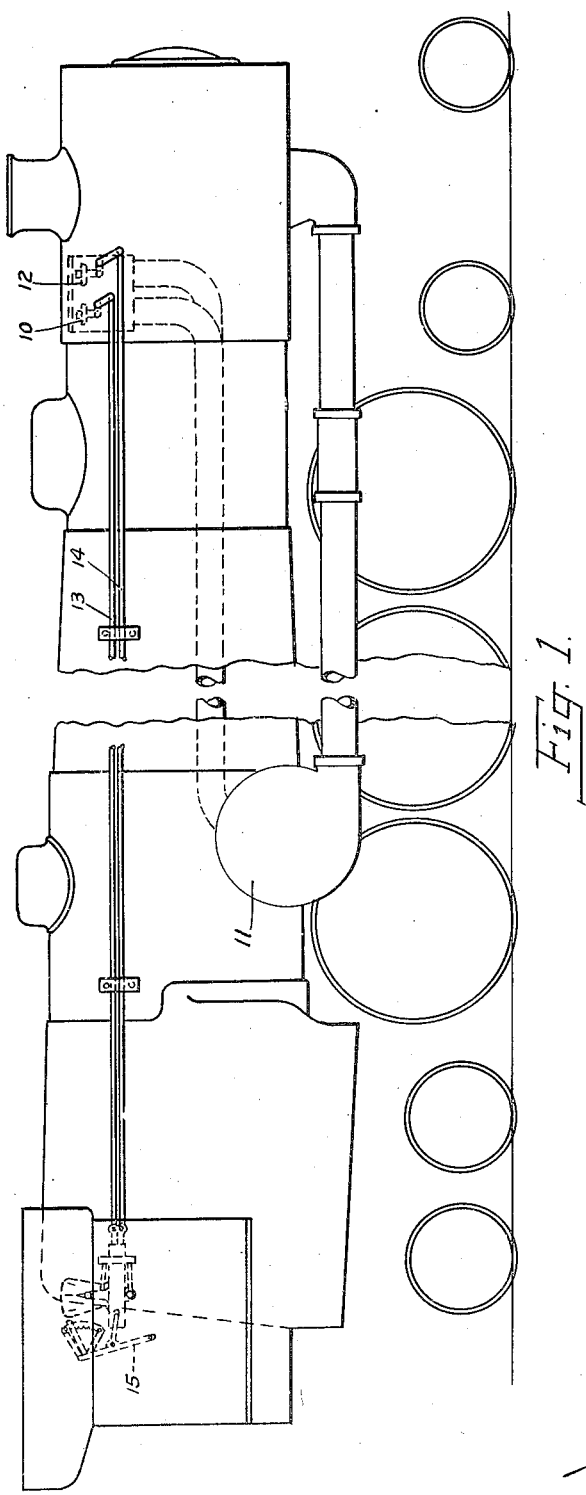
Figure 1 is a diagrammatic elevational view, partly broken away, of a locomotive equipped with mechanism for actuating plural throttles in accordance with the present invention.

The locomotive indicated in Figure 1 is provided with a throttle 10 for controlling the supply of steam to the locomotive engine 11 when it is in forward motion and a throttle 12 for use in reverse motion. Associated with each of these throttles are the usual linkages and operating rods 13, 14, respectively, extending rearwardly into the locomotive cab to be selectively operated by a single throttle lever 15. The operating rods 13, 14 are mounted parallel with each other with their rear ends in closely contiguous relation in a guide-housing 16 and each is formed with a similarly located notch or slot 17, extending inwardly from their abutting edges for selective reception of a stud 18 supported between the bifurcated ends of a link 20 which is pivotally connected at its rearward end with the throttle lever 15. The sides of housing 16 are slotted at 19 to permit the reciprocation of stud 18. The stud 18 extends between the fingers 21 of a selecting lever 22 pivotally mounted at 23 so that when the latter is

Figure 2:
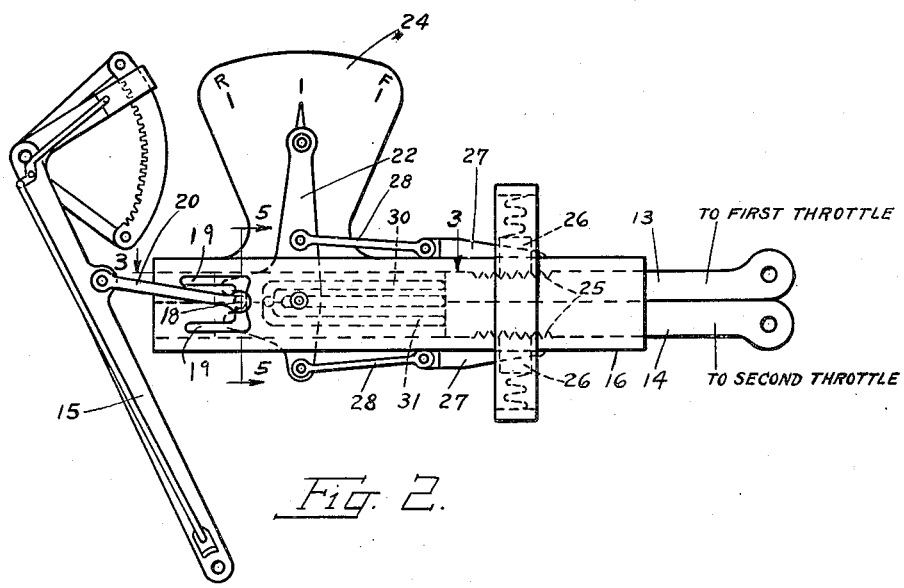
Figure 2 is an elevational view showing the throttle lever provided in the locomotive cab in conjunction with the mechanism for selectively coupling it with the individual operating rods for the two throttles.
Figure 3:
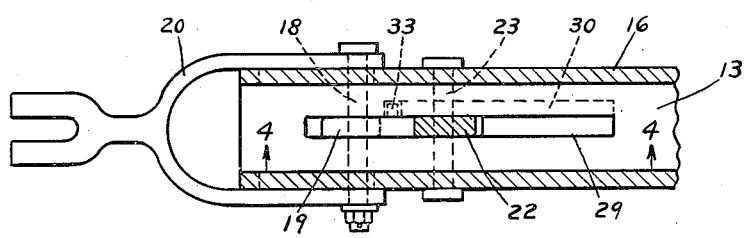
Figure 3 is a sectional view on the line 3—3 in Figure 2.
Figure 4:
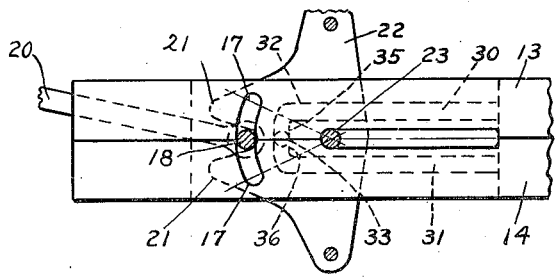
Figure 4 is a sectional view on the line 4—4 in Figure 3 and shows on an enlarged scale the device for coupling the throttle lever with either of the throttle operating rods and Figure 5 is a sectional view on the line 5—5 of Figure 2.
Figure 5:
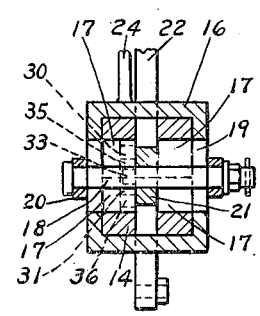

2 swung to the forward or reverse position indicated by the letters R and F on the indicator 24 in Fig. 2 the stud 18 will be either raised or lowered, respectively, into the slot 17 for coupling the related rod 13 or 14 respectively for operation by the throttle lever 15. As appears in Fig. 3, the rods 13, 14 are slotted at 29 to permit their reciprocation inasmuch as lever 22 extends through them.

Each of the rods 13 and 14 is formed close to the selecting lever 22 with rack teeth 25 with which spring pressed detents 26 engage to prevent reciprocation of either rod until release of the related detent. To release the detents 26 sliding wedges 27 are provided each connected by an individual link 28 with the selecting lever 22 so that operation of the latter to selectively couple either rod 13 or 14 with the throttle lever 15 also effects release of its detent 26 by raising it from the rack 25 as the wedge 27 is moved forwardly. To prevent improper movement of the selecting lever 22 during operation of either throttle rod 13 or 14, the two rods are formed with complementary portions of a U-shaped slot 32 extending longitudinally of the rods and the selecting lever 22 is provided with a stud 33 positioned midway in the bight portion of the U-slot 32 and adapted on operation of the selecting lever 22 to be raised or lowered therewith into alignment with the leg portion 30 or 31 of the slot so that once either rod 13 or 14 has been moved to displace the bight portions 35 or 36 of the slot from alinement with the stud 33 the latter is held in the leg 30 or 31 so as to prevent pivotal movement of the selecting lever 22. This maintains the fingers 21 of selecting lever 22 aligned to receive the stud 18.

It is believed that the operation of the throttle operating mechanism should be apparent from the above description but the following brief resume is given of operation for opening the throttle 10 when the locomotive is to move forwardly. Upon clockwise movement of selecting lever 22 to the F or forward position the stud 18 moves into the notch 17 thereby coupling rod 13 with the throttle lever 15. At the same time the selecting lever 22 acts through the link 28 to force the wedge 27 forwardly thereby releasing the detent 26 so that the rod 13 may be drawn rearwardly by the link 20 and stud 18 when the engineer pulls the throttle lever 15 rearwardly. The forward movement of the selecting lever 22 also positioned its stud 33 at the upper end of the bight portion 35 of the U-slot 32 thereby positioning the stud in alinement with the leg portion 30 of the slot that is in the rod 13 so that rearward motion of the latter by moving the bight portion 35 out of alinement with the stud 33 engages it and thereby locks the selecting lever 22 against movement during operation of the throttle lever 15.

Although a detailed embodiment of the invention has been shown in the drawings and described in detail above, it is to be understood that many changes and variations may be made without departing from the invention and therefore it is desired and intended to include all such changes and variations within the scope of the appended claims.

What we claim is:

1. Operating mechanism for a pair of valves or the like comprising individual actuating rods contiguously supported for reciprocation parallel to each other and formed with alined slots; a single operating lever having a stud disposed partly in the slot of each rod; a selecting lever and means on said selecting lever for moving said stud completely into the slot of one of said rods to couple the latter to said operating lever, means for locking the non-selected actuating rod against movement to prevent its operation comprising individual releasable detents engaging each actuating rod; and means operable by said selecting lever for releasing the detent associated with the actuating rod selected for operation by said lever.

2. Selective valve operating mechanism as recited in claim 1 wherein interlocking means are provided for said rods including a U-shaped slot formed partly in each actuating rod with the legs of the U extending longitudinally of the rods; and a stud on said selecting lever disposed between said rods in the bight part of the U-slot and movable into the leg part of the U-slot in either rod to lock said selecting lever against movement on operation of the related rod by said throttle lever.

BERT SMITH.
CHARLES RINGEL.

REFERENCES CITED

The following references are of record in the file of this patent:

UNITED STATES PATENTS

| Number | Name | Date |
|---|---|---|
| 2,195,269 | Coughtry | Mar. 26, 1940 |
| 2,252,273 | Price et al. | Aug. 12, 1941 |
| 2,265,260 | Argo | Dec. 9, 1941 |

FOREIGN PATENTS

| Number | Country | Date |
|---|---|---|
| 23,343 A. D. 1902 | Great Britain | Oct. 1, 1903 |
| 673,823 | Germany | Mar. 29, 1939 |